United States Patent
Zhang et al.

(10) Patent No.: US 10,113,552 B2
(45) Date of Patent: Oct. 30, 2018

(54) SYSTEM, METHOD, AND APPARATUS TO MONITOR COMPRESSOR HEALTH

(71) Applicant: Caterpillar Inc., Peoria, IL (US)

(72) Inventors: Yanchai Zhang, Dunlap, IL (US); Maurice J. Dust, Edwards, IL (US); Zhaoxu Dong, Dunlap, IL (US); Xuefei Hu, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 128 days.

(21) Appl. No.: 15/293,002

(22) Filed: Oct. 13, 2016

(65) Prior Publication Data
US 2018/0106261 A1 Apr. 19, 2018

(51) Int. Cl.
| | |
|---|---|
| G01F 17/00 | (2006.01) |
| G01F 23/00 | (2006.01) |
| F04D 27/00 | (2006.01) |
| G05B 23/02 | (2006.01) |
| G01M 3/00 | (2006.01) |

(52) U.S. Cl.
CPC .......... F04D 27/001 (2013.01); G01M 3/00 (2013.01); G05B 23/0221 (2013.01); G05B 23/0254 (2013.01); G05B 23/0275 (2013.01); G05B 23/0283 (2013.01)

(58) Field of Classification Search
CPC ........... G05B 23/0254; G05B 23/0221; H01M 8/04671; H01M 8/04097
USPC .............................................. 702/33, 50, 51
See application file for complete search history.

(56) References Cited

U.S. PATENT DOCUMENTS

| | | | |
|---|---|---|---|
| 4,330,237 | A | 5/1982 | Battah |
| 5,471,400 | A | 11/1995 | Smalley et al. |
| 6,292,757 | B1 | 9/2001 | Flanagan et al. |
| 6,616,415 | B1 | 9/2003 | Renken et al. |
| 7,403,850 | B1 | 7/2008 | Boutin et al. |
| 7,909,585 | B2 | 3/2011 | Clancy |
| 8,566,070 | B2 | 10/2013 | Tamaki et al. |
| 8,653,979 | B2 | 2/2014 | Obenchain |
| 8,794,000 | B2 | 8/2014 | Baldwin et al. |

(Continued)

FOREIGN PATENT DOCUMENTS

| | | |
|---|---|---|
| CN | 202091172 U | 12/2011 |
| CN | 103410720 | 11/2013 |
| CN | 104533821 | 4/2015 |

*Primary Examiner* — An Do
(74) *Attorney, Agent, or Firm* — Oblon, McClelland, Maier & Neustadt

(57) ABSTRACT

A method, system, and apparatus to monitor health of a compressor are provided. The method, system, and apparatus include detecting whether the compressor has a fault associated using one or more of performance-based modeling and structure-based modeling of physical aspects associated with operation of the compressor; diagnosing any detected fault to determine the cause or causes of the fault; and evaluating each diagnosed fault to assess the significance of the fault. Data pertaining to the cause or causes of the fault and the significance of the fault is used to output health information corresponding to a health state or status of the compressor. The method, system, and apparatus also predict future health-related conditions of the compressor, and data pertaining to the predicted future health-related conditions is used to output health information corresponding to a future health state or status of the compressor.

19 Claims, 7 Drawing Sheets

(56) References Cited

U.S. PATENT DOCUMENTS

| | | |
|---|---|---|
| 2008/0085180 A1 | 4/2008 | Mackenzie et al. |
| 2015/0095100 A1 | 4/2015 | Vittal et al. |
| 2016/0141678 A1* | 5/2016 | Tachibana ......... H01M 8/04671 429/415 |

* cited by examiner

SYSTEM, METHOD, AND APPARATUS TO MONITOR COMPRESSOR HEALTH

TECHNICAL FIELD

The present disclosure relates to compressors, and more particularly to a system, a method, and an apparatus for monitoring health of a compressor.

BACKGROUND

Various gas distribution systems can be employed for distributing gas, such as natural gas, in different geographic locations. Such gas distribution systems usually include compressors, i.e., gas compressors, to compress the gas for distribution.

Compressor health can deteriorate over time, which can lead to faults in the compressor. If such faults go undetected, compressor operation can decline, eventually leading to compressor failure if not remedied.

U.S. Pat. No. 8,566,070, hereinafter the '070 patent, describes monitoring a newly-installed apparatus to detect abnormalities in the newly-installed apparatus using a prediction/judgment model. According to the '070 patent, the prediction/judgment model is created from a meta prediction model for predicting a coefficient and an intercept of prediction models associated with other similar apparatuses. However, the '070 patent is not understood to describe using frequency domain analysis to monitor the newly-installed apparatus to detect abnormalities in the newly-installed apparatus.

SUMMARY OF THE DISCLOSURE

In one aspect of the present disclosure, a computer-implemented method for onboard monitoring of health of a gas compressor is disclosed. The method includes generating, onboard the gas compressor, a virtual performance model of the gas compressor in a first state; receiving, onboard the gas compressor, data corresponding to sensed operating conditions of the gas compressor from one or more sensors, and determining, onboard the gas compressor, based on frequency domain analysis, whether the gas compressor is leaking by comparing output signals of the virtual performance model of the gas compressor in the first state to the data corresponding to sensed operating conditions of the gas compressor. The method further includes outputting, from the gas compressor, health information corresponding to the health of the gas compressor. The health information includes a leak indication regarding whether the gas compressor is leaking based on the determining whether the gas compressor is leaking based on frequency domain analysis.

In another aspect of the present disclosure, a system to monitor health of a compressor is disclosed. The system includes memory configured to store a generated performance model of the compressor in a healthy state and generated performance models of the compressor in different fault states. The system also includes a controller in communication with the memory. The controller is configured to compare output signals of the performance model of the compressor in the healthy state, which have been subjected to frequency domain analysis by the controller, to first data of the compressor sensed during operation of the compressor, and determine whether the compressor has one or more faults based on the compared output signals of the performance model of the compressor in the healthy state and the first data of the compressor sensed during operation of the compressor. The controller is also configured to compare output signals of the performance models of the compressor in the different fault states, which have been subjected to frequency domain analysis by the controller, to the first data of the compressor sensed during operation of the compressor, and determine a potential cause or causes of the one or more faults based on the compared output signals of the performance models of the compressor in the different fault states and the first data of the compressor sensed during operation of the compressor. The controller is configured to output a command to cause display of fault information when the compressor is determined to have the one or more faults. The fault information includes an indication of the determined potential cause or causes of the one or more faults.

In yet another aspect of the present disclosure, a method of determining a leak condition of a gas compressor is disclosed. The method includes generating a performance model of the gas compressor in a healthy state, generating performance models of the gas compressor in different fault states, including at least one fault state corresponding to the leak condition of the gas compressor, and generating a structure-based prediction model for the gas compressor. The method also includes determining, based on frequency domain analysis performed by circuitry of an Electronic Control Module (ECM) of the gas compressor, whether the gas compressor is leaking by comparing output signals of the performance model of the gas compressor in the healthy state to first sensed real-time data of the gas compressor, and determining, using the circuitry of the ECM, whether the gas compressor is anticipated to leak by comparing output signals of the structure-based prediction model for the gas compressor to second sensed real-time data of the gas compressor, where the second sensed real-time data of the gas compressor is different from the first sensed real-time data of the gas compressor. The method further includes determining, using the circuitry of the ECM, where the gas compressor is leaking by comparing output signals of the performance model of the gas compressor in the fault state corresponding to the leak condition of the gas compressor to the first sensed real-time data of the gas compressor, responsive to a determination that the gas compressor is leaking. Additionally, the method includes determining, using the circuitry of the ECM, where and when the gas compressor is anticipated to leak responsive to a determination that the gas compressor is anticipated to leak. The method also includes outputting, on a display, health information identifying one or more of whether the circuitry of the ECM determines the gas compressor is leaking or anticipated to leak, where the gas compressor is leaking or anticipated to leak, or when the gas compressor is anticipated to leak.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
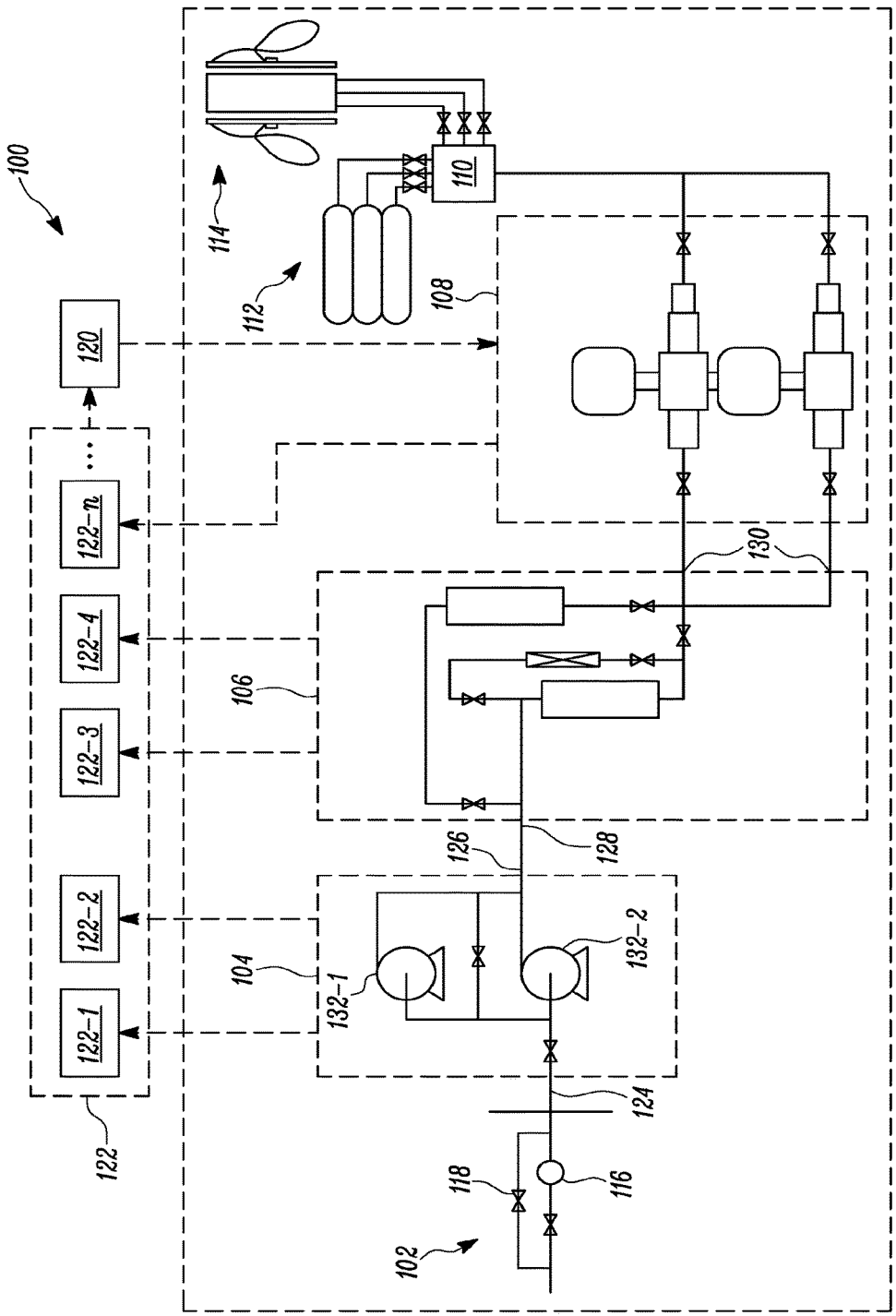
FIG. 1 is a block diagram of a portion of a distribution system having a compressor, according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter may and do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more." Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the disclosed subject matter can involve monitoring health of a compressor, such as a gas compressor, using physical-based modeling, which can include performance-based modeling and/or structure-based modeling. Performance-based modeling can be used to identify whether and/or why (e.g., which component or components) the compressor exhibits fault or failure characteristics during operation. Structure-based modeling may also be used to identify whether and why the compressor exhibits fault or failure characteristics and/or to predict a future health-related condition of the compressor, such as a remaining useful life of the compressor or a future health state of the compressor, such as a future fault or failure. Historical health data of the compressor may be used to determine whether and/or why the compressor exhibits fault or failure characteristics. Historical health data may also be analyzed to predict the future health state of the compressor.

Thus, embodiments of the disclosed subject matter can detect a fault (or faults) of the compressor using physical-based modeling, diagnose the detected fault to determine the cause or causes of the fault, and evaluate the fault to assess the significance or severity of the fault, which, in some cases, may constitute a failure of the compressor. Data pertaining to the cause or causes of the fault and the significance of the fault can be used to output health information corresponding to a health state or status of the compressor. Likewise, data pertaining to the predicted future health-related condition of the compressor can be used to output health information corresponding to a future health state or status of the compressor, such as the remaining useful life of the compressor. Also, in one or more embodiments of the disclosed subject matter, the compressor may be controlled, shut down, for instance, depending upon the severity of a particular fault or failure.

Turning now to the figures, FIG. 1 is a block diagram of a portion of a distribution system having a compressor system 100, according to one or more embodiments of the present disclosure. A compressor 108 of the compressor system 100 may be a gas compressor configured to compress a gas, such as natural gas. Although embodiments of the disclosed subject matter are explained with regard to the compressor 108 of the compressor system 100 in the context of a gas distribution system, the present disclosure can be equally applicable to any compressor employed in any other machine or industry, without departing from the scope of the present disclosure. The compressor 108 may be, but is not limited to, a reciprocating compressor, a rotary compressor, an axial compressor, or a centrifugal compressor. Further, the compressor 108 shown in FIG. 1 may represent multiple compressors.

The compressor system 100 can also include a gas inlet section 102 and a dryer section 106. Optionally, the compressor system 100 can include a booster section 104. The compressor system 100 may also include a valve control panel 110, a storage section 112, and a dispensing section 114. Alternatively, in one or more embodiments, the gas inlet section 102, the booster section 104, the dryer section 106, the valve control panel 110, the storage section 112, and/or the dispensing section 114 may be considered components of the compressor 108.

The gas inlet section 102 can include an inlet valve 116 and a delay gas meter 118 coupled to the inlet valve 116. The inlet valve 116 can allow gas to enter the compressor system 100. The delay gas meter 118 can regulate an amount and a flow rate of gas entering the compressor system 100 through the inlet valve 116.

After entering the compressor system 100 through the gas inlet section 102, gas can pass to the optional booster section 104 disposed downstream of the gas inlet section 102 via an inlet 124 of the booster section 104. The booster section 104 may include one or more pumps 132, individually referred to in FIG. 1 as pumps 132-1 and 132-2, to boost or increase pressure of the gas in the compressor system 100 downstream of the booster section 104. In that the booster section 104 is optional, in one or more embodiments the compressor system 100 may not include the booster section 104.

Generally speaking, the dryer section 106, which may be arranged downstream of the gas inlet section 102 and have an inlet 128 connected to an outlet 126 of the booster section 104 when the booster section 104 is present, can remove water vapor from the gas entering the dryer section 106.

The compressor 108 can have an inlet 130, which may be comprised of one or more individual gas inlets, coupled to an outlet of the dryer section 106. Gas entering the compressor 108 may be compressed by increasing the pressure and reducing volume of the gas. After compression, a flow rate and an amount of gas exiting the compressor 108 may be controlled using the valve control panel 110, for instance, which can receive compressed gas from the compressor 108 and control output of the compressed gas.

The valve control panel 110 may also allow control of one or more valves of the compressor system 100, such as the inlet valve 116, to regulate the flow rate of gas traveling in various sections of the compressor system 100. In a case where the amount of compressed gas to be dispensed from the compressor system 100 is less than an amount of gas received from the compressor 108, a surplus amount of compressed gas may be stored in the storage section 112. In one or more embodiments, the storage section 112 may include a plurality of gas storage chambers to store surplus compressed gas. Further, compressed gas may be dispensed from the compressor system 100 through the dispensing section 114, either from the storage section 112 or from the compressor 108.

In one or more embodiments of the present disclosure, one or more of the gas inlet section 102, the booster section 104, the dryer section 106, the compressor 108, the valve control panel 110, the storage section 112, and the dispensing section 114 can be in communication with one or more of the sensors 122, which may include one or more of sensors 122-1 to 122-n, where n may represent a non-zero positive integer. To be clear, 122-n can represent one or more sensors, and such one or more sensors 122-n can sense operating characteristics or conditions associated with the compressor 108. Further, optionally, in one or more embodiments, only one or more sensors 122-n that sense operating characteristics or conditions associated with the compressor 108 may be used to monitor health of the compressor 108. Thus, embodiments of the disclosed subject matter can monitor health of the compressor system 100, which may include health of the compressor 108, or only health of the compressor 108.

The sensors 122 can sense various operating characteristics associated with the compressor system 100 or, particularly, the compressor 108 in the case of sensors 122-n, as noted above. The sensors 122 may include, but are not limited to, pressure sensors, temperature sensors, vibration sensors, displacement sensors, and/or speed sensors. Examples of pressure sensors include pressure sensors to sense suction pressure, charge pressure, and discharge pressure of the compressor 108. Examples of temperature sensors include sensors to sense bearing temperature, engine temperature, suction temperature, and discharge temperature. Examples of vibration sensors include an accelerometer and a frame transducer. An example of a displacement sensor is a sensor to sense valve position. An example of a speed sensor is a sensor to sense engine speed of an engine of the compressor 108.

As non-limiting examples, a sensor 122-1, from the sensors 122, may sense a first pressure value of gas at an inlet 124 of the booster section 104, a sensor 122-2 may sense a second pressure value of gas at an outlet 126 of the booster section 104, i.e., after passing through the booster section 104, a sensor 122-3 may sense a first temperature value of gas at an inlet 128 of the dryer section 106, and a sensor 122-4 may sense a second temperature value of gas at the inlet 130 of the compressor 108, i.e., after passing through the dryer section 106. Additionally or alternatively, sensors 122-n, which may represent one or more sensors, can detect or sense operating characteristics associated with the compressor 108. Thus, sensors 122-n can be representative of one or more sensors that may include, but are not limited to, one or more pressure sensors to sense pressure associated with compressor operation, such as suction pressure, charge pressure, and/or discharge pressure; one or more temperature sensors to sense temperature associated with compressor operation, such as bearing temperature, engine temperature, suction temperature, and discharge temperature; one or more vibration sensors to sense vibration characteristics associated with compressor operation, such as an accelerometer and a frame transducer; one or more displacement sensors to sense displacement of components of the compressor 108, such as valve displacement; and one or more speed sensors to sense speed associated with compressor operation, such as an engine speed sensor to sense engine speed of the engine of the compressor 108.

Each of the sensors 122 (including sensors 122-n) may output data sampled at a predetermined sampling rate, which may be dependent upon the particular sensed compressor operating characteristic, to a monitoring system 120 that can monitor health of various components of the compressor system 100 and, in turn, the health of the compressor system 100. For example, a temperature sensor of sensors 122-n may be configured to sample temperature of the compressor 108 at a relatively low sampling rate as compared to a sampling rate for a pressure sensor of sensors 122-n configured to sample pressure associated with the compressor 108. Thus, in one or more embodiments of the disclosed subject matter, one or more sensors 122 may collect data regarding operating characteristics of the compressor system 100 or components thereof at a relatively high sampling rate, such as 10 kHz. Additionally or alternatively, the monitoring system 120 can monitor health of only the compressor 108. Further, discussed in more detail below, monitoring health of the compressor 108, particularly the fault detection, diagnosis, evaluation and/or prognostics processing and analysis according to embodiments of the disclosed subject matter, can be performed online at or onboard the compressor 108. That is, such processing and analysis can be performed in locally at the compressor 108, for instance, using components of the compressor 108, such as an Electronic Control Module (ECM) of the compressor 108. Further, some or all of such processing and analysis can be performed in real time.

The construction and operational features of the monitoring system 120 are explained in more detail below in relation to FIG. 2, FIG. 3, and FIG. 4. Further, health monitoring will be discussed in detail below with respect to the compressor 108. However, embodiments of the disclosed subject matter are not limited to monitoring health of only the compressor 108, and may monitor health of other components of the compressor system 100, such as components of the gas inlet section 102, the booster section 104, or the dryer section 106, or even an overall health of the compressor system 100. Thus, where appropriate, the discussion below regarding monitoring health of the compressor 108 may be applicable to the compressor system 100 as a whole or components thereof other than the compressor 108.

Figure 2:
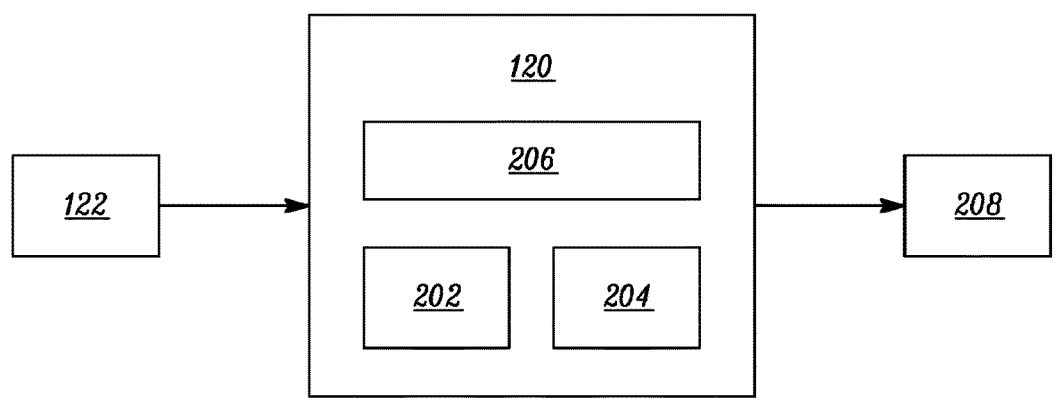
FIG. 2 is a block diagram of a system for monitoring compressor health according to one or more embodiments of the present disclosure.

FIG. 2 illustrates a block diagram of the monitoring system 120, according to one or more embodiments of the present disclosure. Though FIG. 2 illustrates the monitoring system 120 distinct from the compressor 108, in one or more embodiments of the disclosed subject matter the monitoring system 120 can be arranged local to (i.e., onboard) the compressor 108. That is, in one or more embodiments of the disclosed subject matter, the compressor 108 may be comprised of the monitoring system 120. As such, some or all of the processing and analysis to monitor the health of the compressor 108 can be performed locally at the compressor 108 (e.g., online at and/or onboard the compressor 108) without having to output data to a processor remote from the compressor 108 to perform processing or analysis to monitor the health of the compressor 108. Alternatively, a portion of the monitoring system 120 may be provided remote (i.e., offboard) from the compressor 108. For example, memory 206 of the monitoring system 120, which may store historical health data of the compressor 108, may be provided remote from the compressor 108, but in communication with the other components of the monitoring system 120.

Generally, the monitoring system 120 can monitor health of the compressor 108 by detecting whether the compressor 108 has a fault (or faults) using physical-based modeling, diagnosing the detected fault to determine the cause or causes of the fault, and evaluating the fault to assess the significance or severity of the fault. To perform such monitoring health of the compressor 108, the monitoring system 120 can be in communication with each of the sensors 122-n configured to sense operating characteristics or conditions of the compressor 108. As such, the monitoring system 120 can receive signals from the sensors 122-n corresponding to data regarding operating characteristics or conditions of the compressor 108, at respective predetermined sampling rates depending upon the data being sampled, and apply relevant portions of the data to respective physical-based models to characterize the models or generate expected responses from the models.

For example, the monitoring system 120 can include physical-based modeling modules, such as a performance-based modeling module represented by block 402 and/or a structure-based modeling module represented by block 408 (see FIG. 4), and portions of data received from the sensors 122-n can be applied as inputs to corresponding performance models of the performance-based modeling module and structure models of the structure-based modeling module to drive the respective physical-based models (discussed in more detail below). Performance models of the compressor 108, as described herein, may be virtual performance models in that such models can constitute a simulation of the compressor 108 in different performance states. Likewise, each structure model as described herein may be a virtual structure model in that such models can constitute a simulation of a structure-related aspect associated with operation of the compressor 108.

The monitoring system 120 can process the outputs of the physical-based models according to time domain analysis and/or frequency domain analysis, which may produce a set of health signatures for each physical-based model. For example, a set of healthy signatures may be produced by each physical-based model that represents the compressor 108 in a healthy state, and a set of fault signatures may be produced by each physical-based model that represents the compressor 108 in an unhealthy state.

The monitoring system 120 can compare the outputs resulting from the time domain and/or frequency domain analysis, which may still be deemed outputs of the physical-based models, to outputs based on data from the sensors 122-n collected in real-time, for instance. For example, at least one measure-based model of the compressor 108, such as a signal-based model, can receive relevant portions of data from the sensors 122-n during operation of the compressor to characterize the measure-based model or generate an expected response as outputs for comparison against the outputs resulting from the time domain and/or frequency domain analysis.

Optionally, the monitoring system 120 may provide the physical-based models local to the compressor 108. That is, the monitoring system 120, when provided local to the compressor 108, may have stored therein data to generate, initialize, or otherwise provide the physical-based models at the compressor 108. Additionally or alternatively, the monitoring system 120 may have stored therein data to generate, initialize, or otherwise provide the at least one measure-based model at the compressor 108.

Results of the comparison operation between the outputs from the time domain and/or frequency domain analysis and the outputs from the at least one measure-based model can be analyzed by the monitoring system 120 to determine a health characteristic or condition of the compressor 108, such as whether the compressor is in the healthy state or the unhealthy state. Generally, the healthy state can mean that the compressor 108 does not have any detected faults, and the unhealthy state can mean that the compressor 108, at the very least, has at least one detected fault. Discussed in more detail below, the results of the comparison operation between the outputs from the time domain and/or frequency domain analysis and the outputs from the at least one measure-based model can also be analyzed by the monitoring system 120 to diagnose any detected faults and evaluate any diagnosed fault to determine a severity of the fault, which may be referred to as a fault level. Additionally or alternatively, the results of the comparison operation between the outputs from the time domain and/or frequency domain analysis and the outputs from the at least one measure-based model can be analyzed by the monitoring system 120 to determine a predicted health characteristic or condition of the compressor, such as a remaining useful life of the compressor 108 and/or a predicted fault or failure of the compressor 108.

The monitoring system 120 can be in wired and/or wireless communication with an output device 208. Further, the monitoring system 120 can output data corresponding to a current and/or future health state or status of the compressor 108, based on the detection, diagnosis and evaluation operations, to the output device 208 for output as health information of the compressor 108. The output device 208 illustrated diagrammatically in FIG. 2, which may constitute multiple output devices, may be provided locally at the compressor 108 and/or remote from the compressor 108. A non-limiting example of the output device 208 according to embodiments of the disclosed subject matter is a wireless handheld device, such as a portable smart device. Other examples include a personal computer and a control panel of the compressor 108. Optionally, output device 208 can represent a plurality of output devices, as noted above, each configured to output health information pertaining to the current and/or future health state or status of the compressor 108 determined by the monitoring system 120. Thus, output device 208 may represent one or more portable smart devices and/or one or more personal computers. Such health information output by the output device 208 can take the form of a visible message, such as a warning, regarding one or more of a health state or status of the compressor 108, existence of a fault or failure, a possible or probable cause of the fault or failure, a location of the fault or failure, a remaining useful life of the compressor 108, and an anticipated fault or failure, for instance. Further, the message may be output by the output device 208 as an image, a succession of images (e.g., a video, an animation), audio, or a combination thereof. Further, the output device 208 may provide a user interface to monitor health of the compressor 108.

In one or more embodiments of the disclosed subject matter, the monitoring system 120 can also output control signals to control the compressor 108. For example, the monitoring system 120 can output a control signal to shut down the compressor 108 when the monitoring system 120 determines that the compressor 108 has a fault or failure condition with a fault level that requires shut down of the compressor 108.

The monitoring system 120 can include a receiving unit 202, a controller 204 in communication with the receiving unit 202, and memory 206 in communication with the controller 204. Generally, the receiving unit 202, which may be comprised of circuitry, can receive signals from the sensors 122-$n$ and send data corresponding to the signals to the controller 204. The memory 206 may be any non-transitory computer-readable medium. In one example, the non-transitory computer-readable medium may be a volatile memory, such as static random access memory, and/or a non-volatile memory, such as read-only memory (ROM), erasable programmable ROM, and flash memory. Further, though the memory 206 is shown as a separate component of the monitoring system 120, i.e., separate from the controller 204, some or all of memory 206 may be part of controller 204 and/or receiving unit 202. Thus, in one or more embodiments, the controller 204 may include the memory 206 or a portion thereof. Further, in one or more embodiments, the controller 204 and the memory 206 of the monitoring system 120 can be components of the ECM of the compressor 108, which may include an integrated circuit, such as a field programmable gate array (FPGA).

Figure 3:
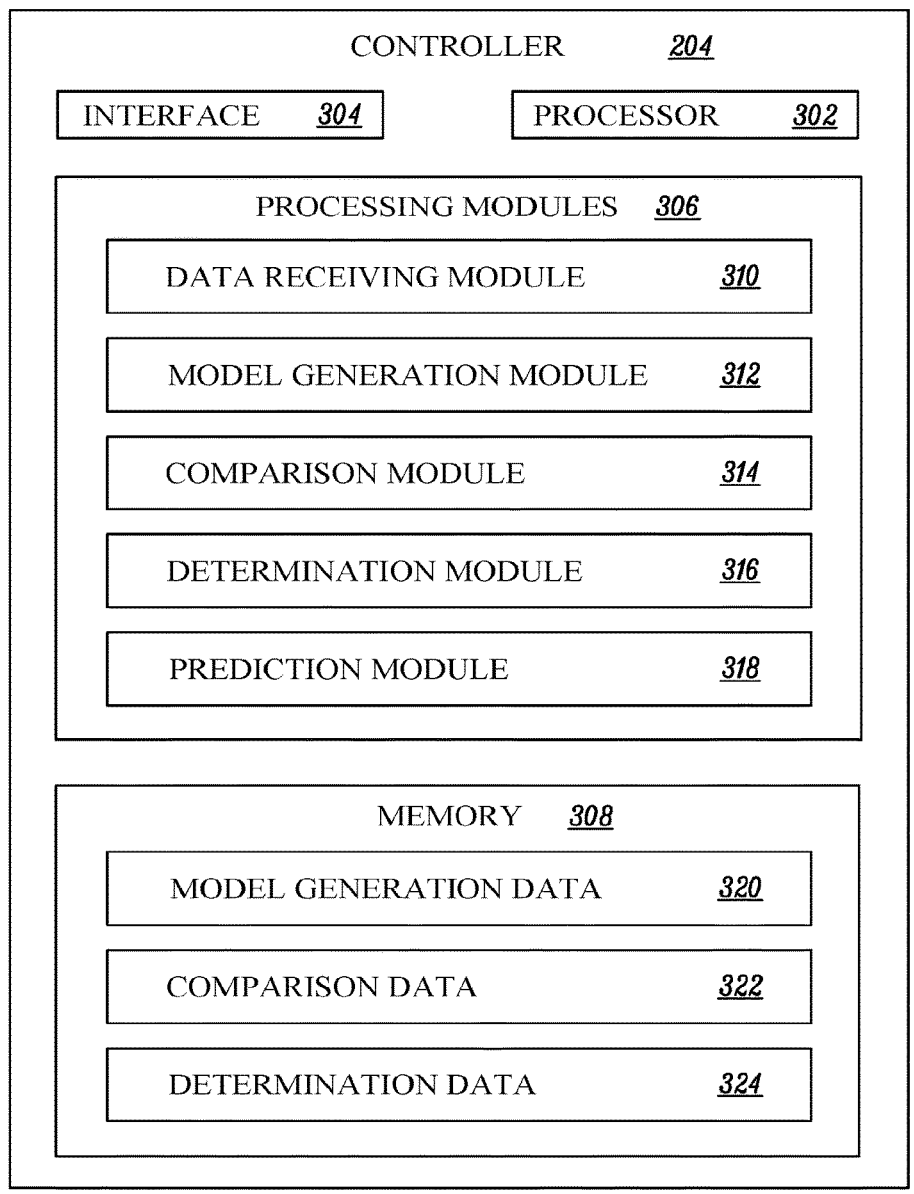
FIG. 3 is a block diagram of a controller for monitoring compressor health according to one or more embodiments of the present disclosure.

FIG. 3 illustrates a block diagram of the controller 204 of the monitoring system 120 according to one or more embodiments of the present disclosure. The controller 204 can include a processor 302, an interface 304, processing modules 306, and memory 308. Generally, the processor 302 may be configured to fetch and execute computer-readable instructions stored in the memory 206. In some embodiments, the processor 302 may be implemented as one or more microprocessors, microcomputers, microcontrollers, digital signal processors, central processing units, state machines, logic circuits or any device that can manipulate signals based on operational instructions.

The interface 304 may facilitate communication for the monitoring system 120 using a variety of protocols and networks, including a wired network, a wireless network, and a combined wired-wireless network. Further, the interface 304 may include a variety of software and hardware interfaces. In one example, the interface 304 may include one or more ports to connect the monitoring system 120 to the output device 208 (which may be multiple different output devices) via a wired and/or wireless communication medium.

The processing modules 306 may include hardware and/or software (e.g., routines, programs, objects, components, and data structures) that can perform particular tasks, operations, steps, methods or processes, or implement particular data types, according to embodiments of the disclosed subject matter. According to one or more embodiments of the present disclosure, the processing modules 306 may include a data receiving module 310, a model generation module 312, a comparison module 314, a determination module 316, and a prediction module 318. Data saved in memory 308 may be data received, processed and/or generated by one or more of the processing modules 306, and may include model generation data 320, comparison data 322, and determination data 324.

Model generation data 320 may include data to generate one or more physical-based models, such as one or more performance models and/or one or more structure models. Examples of performance models include a model of compressor 108 in a healthy state (e.g., no faults or failures) and models pertaining to different fault states of the compressor 108. Some or all of the models pertaining to different fault states of the compressor 108 may correspond to different fault levels for a same fault type or fault mode of the compressor 108. Optionally, vibration-based models may be characterized as performance models. Non-limiting examples of structure models include vibration-based models and cycle-based models, such as cycle-based compressor life prediction models.

Model generation data 320 may also include data generated from subjecting relevant portions of data received from corresponding one or more sensors of the sensors 122-$n$ to performance-based modeling and/or structure-based modeling. For example, data resulting from performance-based modeling may include performance data corresponding to the compressor 108 in the healthy state, such as performance data pertaining to discharge pressure of the compressor 108 in the healthy state. Data resulting from performance-based modeling may also include performance data corresponding to the compressor 108 in one or more unhealthy states, such as performance data pertaining to discharge pressure of the compressor 108 in one or more unhealthy states. Data resulting from structure-based modeling may include data pertaining to a predicted state of the compressor 108.

Of course, in one or more embodiments of the disclosed subject matter, data resulting from the performance-based modeling and/or the structure-based modeling may not be stored in memory 308 as model generation data 320, and may instead be subjected to time domain and/or frequency domain analysis directly. In one or more embodiments of the disclosed subject matter, the model generation module 312 can perform the time domain and/or frequency domain analysis. Therefore, in one or more embodiments of the disclosed subject matter, outputs of the performance-based modeling and/or the structure-based modeling subjected to time domain and/or frequency domain analysis may still be considered outputs of the structure-based models associated with the performance-based modeling and/or the structure-based modeling.

Comparison data 322 can include data resulting from one or more of time domain analysis and frequency domain analysis of the data output from the performance-based modeling and/or structure-based modeling, which may be performed by the model generation module 312. Alternatively, such time domain analysis and/or frequency domain analysis can be performed by the comparison module 314. Discussed in more detail below, the time domain analysis or frequency domain analysis, generally speaking, can include processing and analysis for one or more of pattern recognition, band pass filtering, fast Fourier transform (FFT), threshold-based diagnostics (e.g., frequency-based threshold diagnostics), and life prediction curve, depending upon the particular analysis domain.

Comparison data 322 may also include data generated based on a comparison of the outputs resulting from the time domain analysis and/or frequency domain analysis of the performance and/or structure models with the outputs based on data from the sensors 122-$n$, which may be collected in real time during operation of the compressor 108. As an example, outputs from one or more measure-based models that receive the data from the sensors 122-$n$ can be compared to corresponding outputs resulting from the time domain analysis and/or frequency domain analysis of the performance and/or structure models. Of course, in one or more embodiments of the disclosed subject matter, data resulting from the above-discussed comparison operation may not be stored in memory 308 as comparison data 322, and may instead be sent directly to the determination module 316 to determine a health state or status of the compressor 108. The comparison data 322 can be processed by the determination module 316 to determine a health state or status of the compressor 108, and, if the determined health state of the compressor 108 is an unhealthy state, cause or causes of the unhealthy state and the degree or severity of the unhealthy state.

Generally speaking, determination data 324 can represent data corresponding to a determined current and/or predicted health state of the compressor 108. For example, determination data can be representative of at least one of whether the compressor 108 has one or more faults, identification of each fault, identification of the severity of the fault or faults, which may be called the fault level. Further, generally, such determination data 324 can be based on a result of the comparison between the outputs from the time domain analysis and/or frequency domain analysis of the performance- and/or structure-based modeling with the outputs of corresponding compressor operating data received from various sensors 122-$n$ associated with the compressor 108. Determination data 324 can also include data that relates the result of the comparison of the outputs to certain messages to be output to the output device 208 for output as health information corresponding to a health state or status of the compressor 108. Additionally, determination data 324 may be used to build a reference model for future model-based health analysis of the compressor 108.

Turning now to the processing modules 306 of the controller 204, which may include the data receiving module 310, the model generation module 312, the comparison module 314, the determination module 316, and the prediction module 318, the data receiving module 310 may obtain data from the receiving unit 202 regarding operating characteristics of the compressor 108 received from sensors 122-$n$ associated with the compressor 108. The data regarding operating characteristics of the compressor 108 may include, but are not limited to, data corresponding to pressure (e.g., suction pressure, charge pressure, discharge pressure, etc.), temperature (e.g., gas temperature, bearing temperature, suction temperature, discharge temperature, etc.), gas volume or flow rate, engine speed, valve displacement, and vibration. Some or all of the data may be high frequency data, which can mean that the data is sampled at a relatively high sampling rate, from the sensors 122-$n$, for instance, 10 kHz. For example, pressure- and vibration-related data may be sampled at a relatively high sampling rate (e.g., 10 kHz).

In one or more embodiments, the data receiving module 310 may receive data from the sensors 122-$n$ associated with the compressor 108 corresponding to when the compressor 108 is found or known to be in the healthy state, which may be referred to herein as a first state. Generally, a healthy state of the compressor 108 can be indicative of an operational state of the compressor 108 in which the compressor 108 is free of faults or failures, such as leaks. Further, in one or more embodiments, the healthy state of the compressor 108 may be understood as an operational state in which the compressor 108 is operating within predetermined operating parameters.

In one or more embodiments, data received by the data receiving module 310 may be stored in memory 308 as model generation data 320 in the form of data generated by performance-based modeling of data from corresponding one or more sensors of the sensors 122-$n$ and/or structure-based modeling of data from corresponding one or more sensors of the sensors 122-$n$. Optionally, the data receiving module 310 may be implemented in whole or in part using an integrated circuit of the controller 204 (or processor 302, depending upon the configuration of the controller 204), such as one or more field-programmable gate arrays (FPGAs). Further, in one or more embodiments of the disclosed subject matter, data processed onboard the compressor 108, such as data resulting from operations performed by the model generation module 312, the comparison module 314, the determination module 316, and/or the prediction module 318, may be received by the data receiving module 310 and output to the output device 208, for instance, for output as health information corresponding to the current or predicted health state or status of the compressor 108.

The model generation module 312 can generate, initialize, or otherwise provide one or more physical-based models, which may be Virtual Product Development (VPD) models, i.e., virtual physical-based models representing simulations of various aspects of operation of the compressor 108 in different health states. As discussed above, such physical-based models may be a performance model or models of the compressor 108 in the healthy state and performance models of the compressor 108 in unhealthy states, for instance, in different fault or failure states. Optionally, one or more vibration-based models may constitute one or more performance models generated by the model generation module 312. Additionally, the model generation module 312 can generate one or more physical-based models in the form of structure models. Examples of structure models include vibration-based models and cycle-based models, such as cycle-based life prediction models. Model generation by the model generation module 312 can be performed using an integrated circuit of the controller 204 (or processor 302, depending upon the configuration of the controller 204), such as one or more FPGAs.

Alternatively, in one or more embodiments of the disclosed subject matter, the model generation module 312 may not be present in the controller 204, or, if present, may not generate any physical-based models. In such a case, the performance-based models and/or the structure-based models may be generated offboard the monitoring system 120, particularly where the monitoring system 120 is onboard the compressor 108. Thus, in one or more embodiments, the performance-based modeling and/or structure-based modeling applied to data received from corresponding sensors 122-*n* can be performed offboard the monitoring system 120, where the outputs of the performance-based modeling and/or structure-based modeling can be output to the monitoring system 120 for time domain and/or frequency domain analysis and comparison against current operational data from corresponding sensors 122-*n* of to detect, diagnose, and evaluate the health state or status of the compressor 108.

Data values received from the sensors 122-*n* by way of the data receiving module 310 which correspond to the healthy state of the compressor 108 can be used to generate the above-discussed performance model or models of the compressor 108 in the healthy state. Such one or more performance-based models may be used as online reference models by the monitoring system 120.

Also, the model generation module 312 can generate performance models of the compressor 108 in different fault states, including fault models with different levels of fault states. Generally speaking, the fault state of the compressor 108 can be indicative of an operational state of the compressor 108 in which the compressor 108 is experiencing a fault (or failure) of one or more components. Further, different levels of fault states can mean different levels of fault severity, for instance, for a same fault type or fault mode of the compressor 108. For instance, a medium-level failure mode may represent that the compressor 108 has a fault, but the fault is not severe and either the compressor 108 does not need to be stopped or the component causing the fault replaced immediately, whereas a high-level failure mode may represent that the compressor 108 has a fault necessitating the immediate shutdown of the compressor 108 and replacement of the component causing the fault prior to further operation of the compressor 108. Such faults may be representative of, but are not limited to, a leak, a bearing failure, a stuck valve, and a damaged (e.g., cracked) piston rod. Thus, in one or more embodiments, the fault states can include at least one fault state corresponding to a leak state of the compressor 108, which may mean an operational state in which the compressor 108 is leaking.

The data receiving module 310 can receive data from the sensors 122-*n* when the compressor 108 is operating. Such data may be referred to as real data or real-time data of the compressor 108, since the data may be collected in real time during operation of the compressor 108, and can be representative of actual operational characteristics or conditions of the compressor 108. The physical-based models can be implemented in the time domain and/or the frequency domain, and, once generated or otherwise provided, either from onboard or offboard the compressor 108, the model generation module 312 can provide applicable portions of the data from the sensors 122-*n* to corresponding performance-based models to drive the respective performance-based models. Each of the performance-based models can output data corresponding to performance of the compressor 108 to be processed to generate a set of health signatures of the compressor 108. Likewise, the model generation module 312 can provide applicable portions of data from the sensors 122-*n* to corresponding structure models, and each of the structure models can output data corresponding to structural characteristics of the compressor 108 to be processed to generate a set of predicted health signatures of the compressor 108, for instance.

In one or more embodiments, the comparison module 314 can receive the data resulting from the physical-based modeling by the model generation module 312 and process the data to generate sets of health signatures (or patterns) for each physical-based model. The processing to generate each set of health signatures can include time domain analysis and/or frequency domain analysis, which may include one or more of pattern recognition, band pass filtering, fast Fourier transform (FFT), threshold-based diagnostics, and life prediction curve, depending upon the particular analysis domain and whether the modeling outputs performance data or data corresponding to future health characteristics of the compressor 108. Put another way, each set of health signatures can be subjected to time domain analysis and/or frequency domain processing to place the health signatures into suitable format for comparison against outputs based on data from the sensors 122-*n*, for instance, outputs from measure-based models of the compressor 108 driven by respective portions of data from the sensors 122-*n*.

As a non-limiting example, data sampled from one or more sensors 122-*n* can be converted into the frequency domain using FFT, for instance, and applied to one or more performance models presented in the frequency domain. Additionally or alternatively, a filter, such as a band pass filter, can be applied to eliminate frequency components outside a frequency range where a particular fault manifests in a component of the compressor 108. In one or more embodiments of the disclosed subject matter, the generated sets of health signatures, or the results post-time domain and/or frequency domain processing, can still be considered outputs of the physical-based models.

The comparison module 314 can compare each set of health signatures, which may be in the time domain or the frequency domain, corresponding to each performance model of the compressor 108 in the healthy state, generally speaking, with operational data of the compressor 108 from corresponding sensors 122-*n*. As noted above, an output signal or signals of the performance model of the compressor 108 in the healthy state can be indicative of an operating characteristic or condition of the compressor 108 corresponding to a healthy or non-faulty compressor 108, such as discharge pressure values in the healthy state, charge pressure values in the healthy state, and in-cylinder pressure values in the healthy state.

Deviation of a predetermined amount between the operational data of the compressor 108 from corresponding sensors 122-*n* relative to the set of health signatures corresponding to the performance model of the compressor 108 in the healthy state can indicate that the compressor 108 is in an unhealthy state, for instance, a fault or failure is detected. Similarly, if the operational data of the compressor 108 from corresponding sensors 122-*n* is sufficiently close to one of the sets of health signatures corresponding to the performance model of the compressor 108 in different unhealthy states, which may be referred to herein as different second states, such result can indicate that the compressor 108 is in an unhealthy state, for instance, that a fault is detected. Optionally, the opposite may be true. That is, if the operational data of the compressor 108 from corresponding sensors 122-*n* is sufficiently close to the set of health signatures corresponding to the performance model of the compressor 108 in the healthy state, such result can indicate that the compressor 108 is in the healthy state. Similarly, deviation of a predetermined amount between the operational data of the compressor 108 from corresponding sensors 122-*n* relative to each of the sets of health signatures corresponding to the performance model of the compressor 108 in different unhealthy states can indicate that the compressor 108 is in the healthy state. For example, the comparison may be indicative of a detected fault in the form of a leak in the compressor 108. Alternatively, the comparison may indicate that no leaks in the compressor 108 have been detected.

Thus, in one or more embodiments of the disclosed subject matter, fault detection can be based on comparisons of operational data of the compressor 108 from corresponding sensors 122-*n* with both the set of health signatures corresponding to the performance model of the compressor 108 in the healthy state and the sets of health signatures corresponding to the performance model of the compressor 108 in different unhealthy states. The comparison operation of the comparison module 314 can be performed based on at least one of an error determination technique, a pattern recognition technique, and frequency analysis with amplitude and phase differences. For example, whether the health signatures "match" can be based on either a pattern recognition technique that identifies similarities in patterns between the different sets of health signatures or a frequency-based threshold analysis that assesses whether the amplitudes of the harmonics are within a predetermined range from each other.

Further, the comparison module 314 can output data corresponding to the comparison results, which can indicate a health state or status of the compressor 108. The comparison results may be referred to as a health symptom of the compressor 108, and may represent healthy symptoms of the compressor 108 or unhealthy symptoms of the compressor 108, depending upon a difference in the comparison and/or magnitude of difference in the comparison, for instance. Optionally, historical health data of the compressor 108 can be used to determine whether the compressor 108 is healthy. For example, historical health data of the compressor 108, which may be stored in memory 308, can be used to analyze trends in time of outputs of the physical-based models and their comparisons, over time, with operational data of the compressor 108 from corresponding sensors 122-*n*.

Data from the comparison results can be output to the determination module 316 to diagnosis and evaluate the health of the compressor 108 based on the comparison results. That is, data corresponding to the comparison results can be used to determine a likely or probable health mode of the compressor 108, such as a likely or probably cause of any detected fault or faults of the compressor 108. For example, a score or level indicating a degree to which the sets of health signatures match (or do not match) different health modes can be set for each health mode of the compressor 108. The highest score can mean that the associated health mode has a high probability of characterizing the health state or status of the compressor 108. For example, in embodiments of the disclosed subject matter, the determination module 316 can analyze each set of fault symptoms and determine which faults, of all possible options, are (or are probably) affecting the compressor 108 based on scores assigned to each fault symptom relative to different fault modes of the compressor in the unhealthy state.

Based on the health diagnosis, the determination module 316 can output data regarding the diagnosed health of the compressor 108. For example, the data regarding the diagnosed health of the compressor 108 can include, but is not limited to, a leak indication regarding whether the compressor 108 is leaking. Optionally, the health information can include information corresponding to a cause or causes of the leak, which may include where the compressor 108 is leaking. For example, the determination module 316 can output a command to cause display of health information of the compressor 108 in the form of fault information when the compressor 108 is determined to have a fault. In one embodiment, the failure information includes, but is not limited to, an indication of the determined likely cause or causes of the fault. The determination module 316 can output the command to display the health information on a display, for example, a display of the output device 208.

In one or more embodiments of the disclosed subject matter, the determination module 316 can evaluate health level of the diagnosed health state or status of the compressor 108. For example, the determination module 316 can evaluate a severity of each diagnosed fault of the compressor 108. That is, the determination module 316 can assess the severity of each diagnosed fault to determine a fault level of the diagnosed fault.

Based on the severity of the fault, the determination module 316 can decide on a course of action to take regarding operation of the compressor 108. For example, the determination module 316 may output a control signal to cause the output of information indicating a health state or status of the compressor 108, for example, the unhealthy state (or healthy state if no faults detected). The determination module 316 may also output a control signal to cause output of information indicating that the compressor 108 has a fault, for instance, a warning, and/or the likely or probably cause of the fault. Optionally, in one or more embodiments, the determination module 316 can output a control signal to control the compressor 108 based on the severity of the fault. For instance, the determination module 316 may output a control signal to shut down the compressor 108 when the determination module 316 determines that the severity of the fault is of a sufficient level to warrant the shutdown.

The prediction module 318 of the controller 204 can predict a future health state or status of the compressor 108. For example, the prediction module 318 can predict a fault or probable fault of the compressor 108. The prediction module 318 may also determine a remaining useful life (RUL) of the compressor 108. The prediction module 318 can predict the future health state of the compressor 108 can be determined based on output signals of the structure model, which may be driven by data received from vibration sensors of the sensors 122-*n* by way of the data receiving module 310. Optionally, historical health data of the compressor 108 can be used to predict the future health state or status of the compressor 108, and may be stored in memory 308 as comparison data 322 and/or determination data 324. Generally speaking, historical health data of the compressor 108 may be understood as health data of the compressor 108 collected during operation of the compressor 108 over a period of time. In one embodiment, the determination module 316 can determine whether the remaining useful life of the compressor 108 is at an end-of-life threshold, which may indicate that the compressor 108 is not fit for further operation or should be replaced or overhauled immediately or within a predetermined amount of time. Optionally, the health information that is output, for instance, by output device 208, can include a compressor end-of-life indication that the life of the compressor 108 is a predetermined amount away from a predicted end life of the compressor 108.

Figure 4:
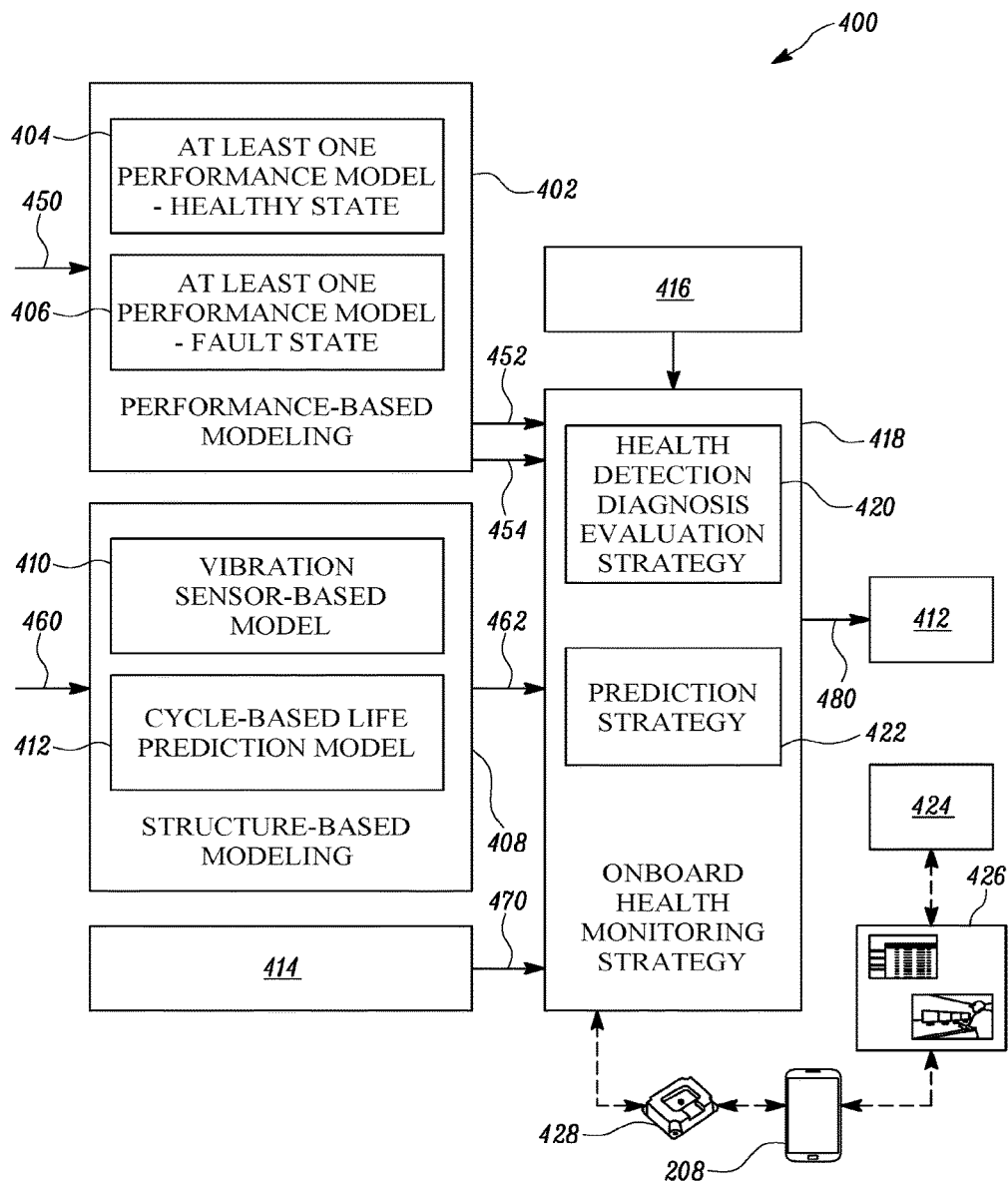
FIG. 4 is a functional block diagram of a system for monitoring compressor health according to one or more embodiments of the present disclosure.

FIG. 4 illustrates a functional block diagram of a system 400 for monitoring health of a compressor, such as compressor 108, according to one or more embodiments of the disclosed subject matter. System 400 can be representative of some or all of the operations of the monitoring system 120 of FIGS. 1 and 2. Thus, the system 400 can perform performance-based modeling at block 402 to detect the health state or status of the compressor 108. Structure-based modeling at block 408 may also be used to detect the health state of the compressor 108. The performance-based modeling at block 402 can also form the basis to diagnosis and evaluate the detected health state of the compressor 108. The performance-based modeling of block 402 and the structure-based modeling of block 408 may be implemented using at least the model generation module 312 of controller 204. The diagnosis, evaluation and decision operations regarding the detected health state of the compressor 108 can be implemented using the determination module 316 of the controller 204. The structure-based modeling of block 408 to determine the future health state of the compressor 108 can be performed using prediction module 318.

The performance-based modeling at block 402, generally speaking, can entail performance-based modeling driven by data from sensors 122-$n$ associated with the compressor 108 received as sensor performance inputs 450. The performance-based modeling at block 402 can include at least one healthy performance model of the compressor 108 in the healthy state at block 404 and at least one fault performance model of the compressor 108 in the unhealthy state at block 406. In one or more embodiments of the disclosed subject matter, a plurality of unhealthy performance models of the compressor 108 in different unhealthy states, such as different fault states, may be implemented at block 406.

The at least one healthy performance model at block 404 can be driven by the data from the sensors 122-$n$ to provide healthy performance data 452 for diagnosis, evaluation and decision operations regarding the detected health state of the compressor at block 418. Likewise, the fault performance model at block 406 can be driven by the data from the sensors 122-$n$ to provide unhealthy performance data 454 for diagnosis, evaluation and decision operations regarding the detected health state of the compressor at block 418. As noted above, the outputs from each performance model can be subjected to time domain and/or frequency domain processing and analysis, so the healthy performance data 452 and the unhealthy performance data 454 may, in one or more embodiments, be in the format of data from the corresponding performance models further processed according to time domain and/or frequency domain analysis.

The sensor performance inputs 450 to the performance-based modeling at block 402 may include, but are not limited to, pressure, engine speed, temperature, valve displacement, and suction pressure associated with operation of the compressor 108. Further, the sensor performance inputs 450 may be received from the plurality of sensors 122-$n$, which may include, but are not limited to, engine speed sensors, discharge pressure sensors, bearing temperature sensors, and valve displacement sensors.

The structure-based modeling at block 408, generally speaking, can entail structure-based modeling of data from sensors 122-$n$ associated with the compressor 108 received as sensor structure inputs 460. The structure-based modeling at block 408 can include at least one structure model associated with the compressor 108. The at least one structure model may include, but is not limited to, one or more of a vibration sensor-based structure model at block 410, which may be characterized as a virtual vibration sensor-based model, and a cycle-based life prediction model at block 412. The vibration sensor-based model at block 410 and a cycle-based life prediction model at block 412 each can be driven by data from the sensors 122-$n$ to provide prediction data 462 for diagnosis, evaluation, and prediction operations regarding the detected health state or status of the compressor at block 418. The vibration sensor-based model at block 410 can be driven based on values of data received from vibration sensors of the plurality of sensors 122-$n$ received as sensor structure inputs 460. The cycle-based life prediction model at block 412 may be used to predict a service-life of components of the compressor 108, such as a compressor body, a valve, and a bearing, or a service-life of the compressor 108 as a whole, and may be driven based on inputs from the sensors 122-$n$ detecting operating data corresponding to valve displacement, engine speed, discharge pressure, bearing temperature, etc.

Outputs of the performance models and the structure models from the block 402 and the block 408, respectively, can be provided for processing at block 418 to diagnosis, evaluate and decide operations to take regarding the detected health state or status of the compressor. Further, data corresponding to characteristics or conditions of the compressor 108 during operation can be received at the block 416 from sensors 122-$n$, in real-time, for instance, and provided to block 416 to detect and eventually diagnosis, evaluate and decide operations to take regarding the detected health state of the compressor at block 418. Optionally, historical health data of the compressor 108 can be provided from block 414, by way of a historical data input 470, to be processed at block 418 to detect, diagnosis, evaluate and decide operations to take regarding the detected health state or status of the compressor.

A health detection, diagnosis and evaluation strategy can be performed at block 420 to determine whether the compressor 108 is in the healthy state or the unhealthy state, to diagnosis of the particular state of the compressor 108, and to evaluate the diagnosed health state to determine whether and what actions to take regarding the determined health state or status of the compressor 108. In the case of detecting the health state or status of the compressor 108, existence of a fault, for instance, can be determined Health detection, for instance, fault detection, can be based on comparisons of operational data of the compressor 108 from corresponding sensors 122-$n$ relative to different sets of health signatures corresponding to the performance models of the compressor 108, as discussed above.

Generally speaking, for the error determination technique, the determination module 316 can determine a deviation of data of block 416 from the sensors 122-$n$ of the compressor 108 relative to the outputs of performance models. Based on the deviation, existence of the fault in the compressor 108 may be detected. Optionally, outputs of the structure modeling at block 410 can be used to detect whether the compressor 108 has a fault. In case of the band pass filter technique, a fault mode band pass may be used to determine the fault in the compressor 108. In such a case, a frequency of the fault may be determined where the frequency is detected. Further, there may be a specified frequency or frequency band defined for each speed associated with operation the compressor 108, such as different engine speeds. Also, certain speeds may be used to monitor certain frequencies. Similarly, a certain frequency may be monitored at different speeds. For example, in case of discharge pressure-fault mode band pass, a fault at a fault frequency can be observed when the fault occurs. In case of the pattern recognition technique, various fault models may be mapped against real-time patterns of data from block 416 from the sensors 122-$n$ of the compressor 108 to determine whether the real-time data follows any of the fault models. Based on the monitoring of the pattern of the real-time data, a fault in the compressor 108 can be determined. For the frequency domain analysis, frequency analysis with amplitude and a phase difference for the real-time data may be performed to determine the fault or faults in the compressor 108.

A prediction strategy may be implemented at block 422 to determine a future or predicted health state or status of the compressor 108. For instance, vibration-based life cycle prediction may be implemented using prediction data 462 output from one or more vibration sensor-based models at 410, for instance, to determine a remaining useful life of the compressor 108. Such vibration-based life cycle prediction can also be based on data from block 416, and optionally the historical health data of the compressor 108 from block 414. The monitored vibrations may be based on engine speed to analyze a number of cycles. Further, based on amplitudes of vibration sensor signals, the remaining useful life of a component of the compressor 108 may be predicted.

At block 412, data pertaining to the health of the compressor 108 can be provided for output as health data 480. The health data 480 may be provided so corresponding health information regarding the determined health of the compressor 108 can be displayed local at the compressor 108 or remote from the compressor 108. In the case of FIG. 4, block 412 can represent a notification displayed local at the compressor 108, on a control panel of the compressor 108. The notification may correspond to a fault level (e.g., severe, intermediate or non-severe) of a diagnosed fault of the compressor 108 determined by block 420.

Additionally or alternatively, health data corresponding to health information of the compressor 108 may be output to the output device 208, via a network manager 428, for instance. Further, data corresponding to the health information regarding the health of the compressor 108 may be provided to back-office device 426, such as a personal computer or server, provided remote from the compressor 108. Such output may assist with ordering and scheduling maintenance regarding a faulty component of the compressor 108 with a maintenance facility 424. Optionally, in one embodiment, the health information pertaining to the health of the compressor 108 can be stored in an external or internal database, such as a back-office server for future reference as historical health data at block 414. The historical health data stored on the back-office server may be used to determine a remaining useful life of components of the compressor 108 or the compressor 108 as a whole.

INDUSTRIAL APPLICABILITY

The present disclosure relates to the compressor 108, the monitoring system 120, and methods 500, 600, and 700 for monitoring health of the compressor 108. Each of the methods 600, 700, and 800 may be computer-implemented. Further, each of the methods 600, 700, 800 can be implemented using the monitoring system 120, or components thereof, such as the processing modules 306, memory 308, interface 304, and processor 302 of controller 204.

The monitoring system 120 may be implemented onboard or offboard the compressor 108. As noted above, the monitoring system 120 can include the controller 204 and the memory 206 in communication with the controller 204. The monitoring system 120 can detect, diagnose, and evaluate a current health state or status of the compressor 108. For example, the monitoring system 120 can detect that the compressor 108 has a fault, diagnosis the fault to determine the cause or causes of the fault, and evaluate the severity of the fault and its impact on the compressor 108. Additionally, the monitoring system 120 can determine which operation or operations to take as a result of the evaluated health of the compressor 108, such as outputting health information pertaining to the health state or status of the compressor 108, outputting health information pertaining to a diagnosed fault, or controlling the compressor 108. The monitoring system 120 can also predict a future health state of the compressor 108.

Figure 5:
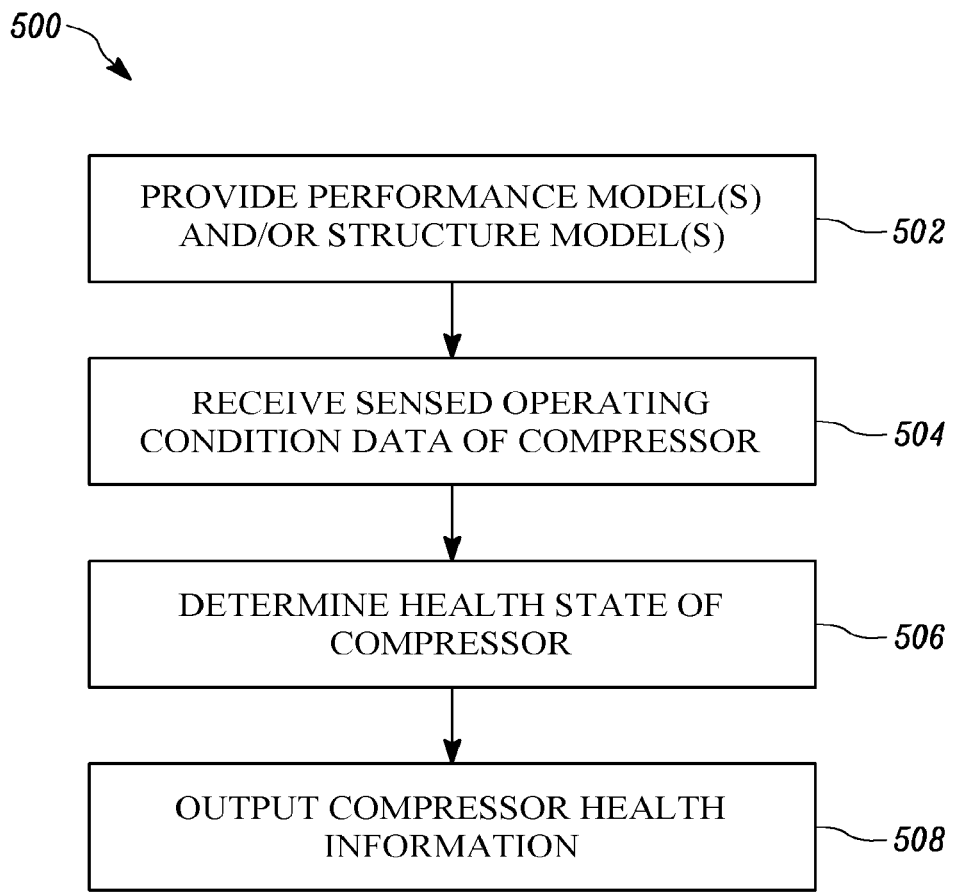
FIG. 5 is a flowchart for a method of monitoring compressor health according to one or more embodiments of the present disclosure.

FIG. 5 illustrates a flowchart for the method 500 of monitoring compressor health according to one or more embodiments of the present disclosure.

At block 502, the method 500 can include generating or otherwise providing at least one performance model of the compressor 108 in the healthy state, which may be referred to herein as a first state, for instance. The at least one performance model of the compressor 108 in the healthy state can be generated onboard the compressor 108. The at least one performance model of the compressor 108 in the healthy state may be a virtual performance model in that such model can constitute a simulation of the compressor 108 in the healthy state. The healthy state may be indicative of an operational state of the compressor 108 in which the compressor 108 is free of faults, such as leaks.

In one embodiment, the method 500 can also include generating or otherwise providing performance models of the compressor 108 in different unhealthy or fault states, which may be referred to herein as different second states, for instance. In such an embodiment, the fault states may include at least one fault state which corresponds to or indicates a leak state of the compressor 108. In one embodiment, the model generation module 312 of the controller 204 of the monitoring system 120 can generate or otherwise provide the performance model of the compressor 108 in the healthy state. Likewise, the model generation module 312 of the controller 204 of the monitoring system 120 can generate or otherwise provide the performance models of the compressor 108 in different fault states. The performance models of the compressor 108 in the different unhealthy states, that is, for instance, different fault states, may be a virtual performance model in that such model can constitute a simulation of the compressor 108 in the different unhealthy states.

At block 504, the method 500 can include sensing operating conditions of the compressor 108 and outputting data corresponding to the sensed operating conditions of the compressor 108. The data corresponding to the sensed operating conditions of the compressor 108 may be indicative of values sensed by the sensors 122-$n$ disposed in and/or around the compressor 108 when the compressor 108 is operating. In one embodiment, the data receiving module 310 can receive the data sensed by the sensors 122-$n$ corresponding to operational conditions of the compressor 108.

At block 506, the method 500 can include determining a health state or status of the compressor 108, which may include a current health state of the compressor 108. For example, the method, at block 506, can determine whether the compressor 108 has a fault by comparing, generally speaking, output signals from the performance models driven by the data corresponding to the sensed operating conditions of the compressor 108 with the data corresponding to the sensed operating conditions of the compressor 108. As discussed above, the results of the comparison determine whether the compressor is in the healthy state or the unhealthy state. For example, block 506 can determine whether the compressor 108 is leaking by comparing output signals of the performance-based model of the gas compressor 108 in the healthy state with sensed data corresponding to operating conditions of the compressor 108. Deviation of a predetermined amount between the compared data can indicate that the compressor has a fault, for instance, is leaking. As discussed above, the determination of whether the compressor 108 is leaking can be performed based on frequency domain analysis, and may be performed onboard the compressor 108 using the ECM of the compressor 108, for instance. In one or more embodiments, the model generation module 312 and the comparison module 314 of the controller 204 may perform the operations of block 506.

In one embodiment, the method 500, at block 506, can also include determining, based on frequency domain analysis, information corresponding the cause of the detected fault, such as where and why the compressor 108 is leaking. That is, block 506 may also involve diagnosis of the detected fault to determine the cause or causes of the fault. Block 506 may additional include evaluation of the diagnosed fault, as discussed above. In one or more embodiments, the determination module 316 of the controller 204 of the monitoring system 120 can determine perform the diagnosis and evaluation of the diagnosed fault.

At block 508, the method 500 can include determine whether and which actions to take based on the diagnosis and evaluation of the health of the compressor 108. For example, method 500 can output health information corresponding to the health of the compressor 108 at block 508. The health information may include, but is not limited to, an indication regarding the health state or status of the compressor 108, that a fault has been detected in the compressor 108, the cause or causes of the fault, and the severity or fault level of the fault. For example, at block 508 the method 500 can output health information in the form of an indicator that the compressor 108 is leaking. Additionally or alternatively, in one embodiment, the health information may include, but is not limited to, a leak location indication regarding where the compressor 108 is leaking. In another embodiment, the health information may include, but is not limited to, a cause of the leak. In one embodiment, the determination module 316 of the controller 204 of the monitoring system 120 can output the health information of the compressor 108 to output device 208, which may be provided either onboard the compressor 108 or offboard the compressor 108.

Optionally, the method 500 can include generating or otherwise providing one or more structure models of the compressor 108 at block 502. At least one structure model may be a virtual vibration sensor-based model. Further, at block 506, the method 500 can include determining a remaining useful life of the compressor 108 based on comparison of output signals of the structure model and the sensed data corresponding to operating conditions of the compressor 108. Optionally, saved historical health data of the compressor 108 may be used to determine the remaining useful life of the compressor 108 at block 506. In one embodiment, the method 500 can include determining whether the remaining useful life of the gas compressor 108 is at an end-of-life threshold. In such an embodiment, the health information that can be output at block 508 may include, but is not limited to, a compressor end-of-life indication that the life of the compressor 108 is either at or a predetermined time away from a predicted end life of the compressor 108. The prediction module 318 may determine the remaining useful life of the compressor 108 and whether the remaining useful life of the gas compressor 108 is at an end-of-life threshold.

Figure 6:
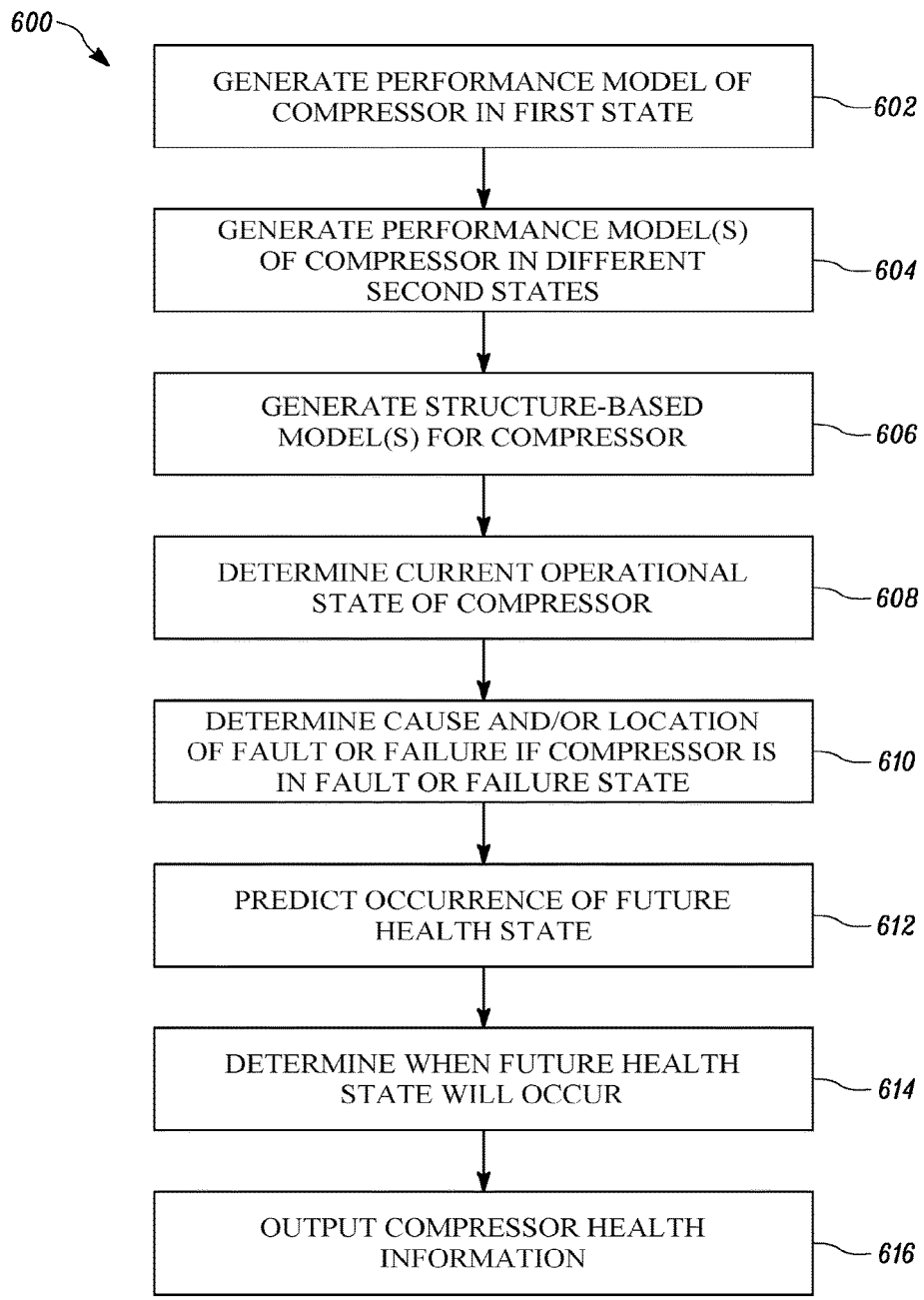
FIG. 6 is a flowchart of a method of determining a health characteristic of a compressor according to one or more embodiments of the present disclosure.

FIG. 6 illustrates a flowchart for the method 600 of determining compressor health characteristics according to one or more embodiments of the present disclosure.

At block 602, the method 600 can include generating or otherwise providing a performance model of the compressor 108 in the healthy state, which may be referred to herein as the first state. The performance model of the compressor 108 in the healthy state can be generated or otherwise provided using circuitry of the ECM of the compressor 108, for instance. Further, in one embodiment, the model generation module 312 can generate the performance model of the compressor 108 in the healthy state. Optionally, the model generation module 312 may be implemented using circuitry of the ECM of the compressor 108.

At block 604, the method 600 can include generating or otherwise providing performance models of the compressor 108 in different fault states, which may be referred to herein as different second states. The fault states may include at least one fault state corresponding to a leak condition of the compressor 108. In one embodiment, the model generation module 312 can generate the performance-based models of the compressor 108 in the different fault states.

At block 606, the method 600 can include generating one or more structure models associated with operation of the compressor 108. The structure model may be a structure-based prediction model of the compressor 108 to predict a future health state of the compressor 108. In one embodiment, the model generation module 312 can generate the structure model for the compressor 108.

At block 608, the method 600 can include determining, based on frequency domain analysis, whether the compressor 108 is in the healthy state or the unhealthy state. That is, block 608 can involve detecting whether the compressor 108 is in the healthy state or the unhealthy state. Such detection can be performed by comparing output signals of the performance model of the compressor 108 in the healthy state to sensed data corresponding to operating conditions of the compressor 108. Such detection may also be performed by comparing sensed data corresponding to operating conditions of the compressor 108 to outputs the performance models of the compressor 108 in different fault states. In one embodiment, the determination module 316 can determine whether the compressor 108 is in the healthy state or the unhealthy state.

At block 610, the method 600 can include diagnosing the detected health state of the compressor 108. For example, the method 600 can diagnose a cause or causes of a detected fault of the compressor 108. At block 610, the method 600 may also include determining where the compressor 108 is faulty, for instance, where the compressor 108 is leaking, based on the comparison of the output signals of the performance models of the compressor 108 in the different failure states corresponding to the leak state and the sensed data corresponding to operating conditions of the gas compressor 108. In one embodiment, the determination module 316 can perform the diagnosing operations regarding the health state of the compressor 108.

Additionally or alternatively, at block 612, the method 600 can determine an anticipated future health state or status of the compressor 108. For example, at block 612 the method can determine whether the compressor 108 is anticipated to leak. Such determination of the anticipated future health state of the compressor 108 can be performed based on the comparison of output signals of one or more structure models for the compressor 108 with corresponding sensed data regarding operating conditions of the compressor 108. In one embodiment, the prediction module 318 of the controller 204 of the monitoring system 120 can determine the anticipated future health state of the compressor 108.

At block 614, the method 600 can include determining when the compressor 108 is anticipated to reach the anticipated future health state. leak responsive to a determination that the compressor 108 is anticipated to leak at block 612. In one embodiment, the prediction module 318 can determine where and when the compressor 108 is predicted to leak.

At block 616, the method 600 can include outputting, on a display of the output device 208, for instance, health information corresponding to a current and/or future health state or status of the compressor 108. For example, at block 616 the method 600 can output health information that whether a fault was detected in the compressor 108. The health information may also indicate when the compressor 108 is anticipated to experience a future fault. For example, at block 616, the method 600 can output as health information an indication that identifies one or more of whether the compressor 108 is leaking or anticipated to leak, where the compressor 108 is leaking or anticipated to leak, or when the compressor 108 is anticipated to leak. In one embodiment, the determination module 316 can output health information corresponding to the current health state or status of the compressor 108 for output by the output device 208. In one embodiment, the prediction module 318 can output health information corresponding to the future health status of the compressor 108 for output by the output device 208.

Figure 7:
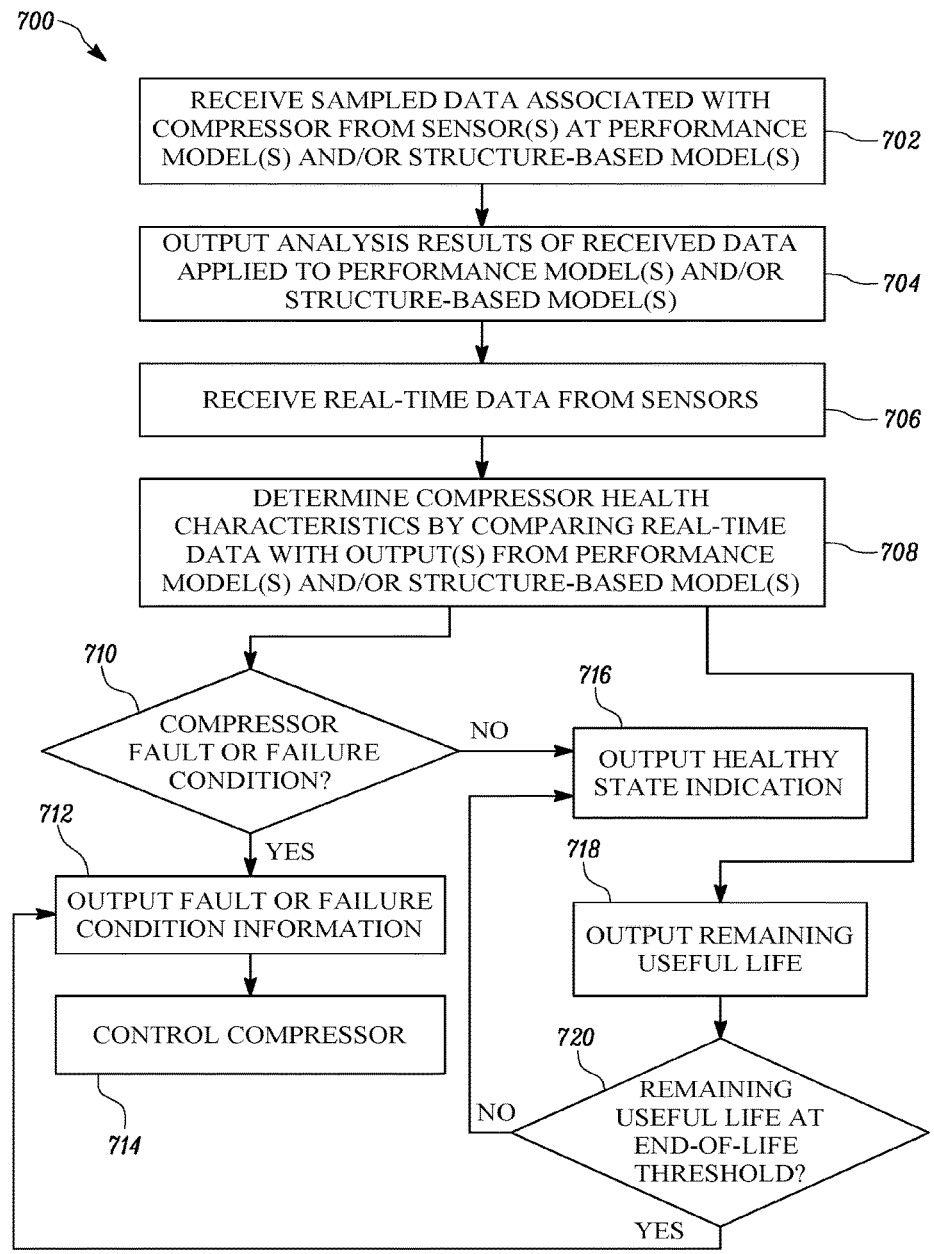
FIG. 7 is a flowchart of a method of monitoring compressor health according to one or more embodiments of the present disclosure.

FIG. 7 illustrates a flowchart for the method 700 of monitoring compressor health according to one or more embodiments of the present disclosure.

At block 702, the method 700 can include collecting data corresponding to operating conditions of the compressor 108 using the sensors 122-n. The data, which may be high frequency data, can include, but are not limited to, an engine speed value, a discharge pressure value, a temperature value, and data received from accelerometers. Block 702 of the method 700 can also include providing the collected data to drive a plurality of performance models and/or the structure models, as discussed above. The collected data may be stored onboard the compressor 108, for instance, at the ECM, or offboard the compressor 108, in a back-office device, for instance. Data pertaining to life prediction of the compressor 108 may be stored in the back-office device, which may be connected to the monitoring system 120 through telematics or any network known in the art.

At block 704, the method 700 can include outputting signals corresponding to the performance models and/or the structure models as driven by the collected data corresponding to operating conditions of the compressor 108. The signals output by the performance models may be indicative of values of parameters which may include, but are not limited to, a discharge pressure for the compressor 108 in the healthy state, a charge pressure for the compressor 108 in the healthy state, an inline pressure for the compressor 108 in the healthy state, a discharge pressure for one or more fault states of the compressor 108, a charge pressure for one or more fault states, and an inline pressure for one or more fault states. The signals output by the structure models may be associated with the structure and construction of the compressor 108 during operation of the compressor 108. As noted above, the data output from the physical-based models, which may be characterized as sets of health signatures, may be subjected to time domain and/or frequency domain processing and analysis.

At block 706, the method 700 can include receiving data corresponding to operating conditions of the compressor 108 from the sensors 122-n for data-based analysis. Such data may be referred to as real data, and may be received in real time. As noted above, the sensors 122-n may include pressure sensors, vibration sensors, engine speed sensors, temperature sensors, valve displacement sensors, suction pressure sensors, charge sensors, discharge sensors, and in-line pressure sensors.

At block 708, the method 700 can determine a health characteristic of the compressor 108, such as whether the compressor 108 is detected to be in the healthy state or the unhealthy state. For example, the determined health characteristic may be that the compressor 108 is detected to have a fault. Such determination can be performed by comparing performance of the data received at block 706 to outputs of the performance models and/or the structure models, which may have been subjected to time domain analysis and/or frequency domain analysis, to determine the health characteristic of the compressor 108. In the example above, such comparison can detect whether a fault or fault exists in the compressor 108. In one embodiment, the data received at block 706 can be compared with the structure models to predict a future health state of the compressor 108 or components thereof, such as to predict the service life of components of the compressor 108.

Determining or predicting whether the health of the compressor 108 is compromised, based on the comparison in the block 708 may be based on a threshold value defined for the comparison of the real data with the performance models and the structure models. For example, the threshold value for the comparison may be defined as a 90% match. In such a case, if more than 90% of the real data matches the output of one of the performance models, then it is determined that the compressor operating characteristics "match" the particular performance model, which may mean the compressor is in the healthy state or the unhealthy state, depending upon whether the performance model pertains to the healthy model of the compressor 108 or the unhealthy model of the compressor 108.

In one embodiment, the method 700 can proceed from the block 708 to block 710 to output a health state of the compressor 108. Additionally or alternatively, the method 700 can proceed from the block 708 to the block 718 to output information corresponding to a predicted or future health state of the compressor 108, such as a predicted remaining useful life of the compressor 108.

The method 700, at block 710, can proceed to block 716 to output an indication that the compressor 108 is determined to be in the health state by the operations performed for block 708. That is, if block 708 determines that the compressor 108 does not have a fault, the method 700 can proceed to block 716 to output health information indicating that the compressor 108 is in the health state.

Otherwise, the method 700 can proceed to block 712, which can include, generally speaking, diagnosing the detected fault (or faults) of the compressor 108 to identify a cause or probably cause of the fault. In one embodiment, the faults may include, but are not limited to, valve leakage, a sticking valve, bearing failure, and a cracked piston rod. Block 712 can also include evaluating the diagnosed fault to determine the severity or fault level of the fault. At the block 712, health information corresponding to the diagnosed and evaluated fault of the compressor 108 can be output. In one embodiment, such health information can be transmitted to the operator via the output device 208, which may be a smart phone. Thus, an operator using the output device 208 may be able to access information from of the monitoring system 120 through an application running on the output device 208.

At block 714, the method 700 may control the compressor 108 based on the severity of the fault. For example, the monitoring system 120 may output a control signal to shut down the compressor 108 or put the compressor 108 in a standby mode when the severity of the fault is high.

As noted above, the method 700 can proceed from the block 708 to the block 718 to output health information corresponding to a predicted or future health state of the compressor 108, such as a predicted remaining useful life of the compressor 108. Thus, block 708 can also determine health information corresponding to the predicted or future health state of the compressor 108 for output at block 718.

At block 720, the method 700 can determine whether the remaining useful life of one or more components of the compressor 108, or the compressor 108 itself, is at or a predetermined amount away from a predicted service life. In one embodiment, when it is determined that the remaining useful life is at or within the predetermined amount away from the predicted service life of the compressor 108, the method 700 can proceed to block 712, which can also include outputting health information of the compressor 108 indicating that the compressor 108, or one or more components thereof, has reached a predicted end of life status. Otherwise, the method can proceed to block 716 to output health information indicating that the compressor 108 is in the healthy state, which may mean the compressor 108 or components thereof have not reached their predicted service life or are not the predetermined amount away from their predicted service life.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A computer-implemented method for onboard monitoring of health of a gas compressor, the method comprising:
   generating, onboard the gas compressor, a virtual performance model of the gas compressor in a first state;
   receiving, onboard the gas compressor, data corresponding to sensed operating conditions of the gas compressor from one or more sensors;
   determining, onboard the gas compressor, based on frequency domain analysis, whether the gas compressor is leaking by comparing output signals of the virtual performance model of the gas compressor in the first state to the data corresponding to sensed operating conditions of the gas compressor;
   outputting, from the gas compressor, health information corresponding to the health of the gas compressor, the health information including a leak indication regarding whether the gas compressor is leaking based on the determining whether the gas compressor is leaking based on frequency domain analysis;
   generating, onboard the gas compressor, a virtual structure model of the gas compressor; and
   determining a remaining useful life of the gas compressor based on outputs of the virtual structure model, the data corresponding to sensed operating conditions of the gas compressor, and saved historical health data of the gas compressor.

2. The method of claim 1, further comprising:
   generating; onboard the gas compressor; virtual performance models of the gas compressor in different second states, including at least one second state corresponding to a leak state of the gas compressor; and
   determining, onboard the gas compressor, based on frequency domain analysis, information corresponding to where the gas compressor is leaking by comparing output signals of the virtual performance model of the gas compressor in the at least one second state corresponding to the leak state of the gas compressor to the data corresponding to sensed operating conditions of the gas compressor,
   wherein the health information includes a leak location indication regarding where the gas compressor is leaking based on the determining information corresponding to where the gas compressor is leaking based on frequency domain analysis.

3. The method of claim 1, further comprising:
   generating, onboard the gas compressor, virtual performance models of the gas compressor in different second states, including at least one second state corresponding to a leak state of the gas compressor; and
   determining, onboard the gas compressor based on frequency domain analysis, information corresponding to why the gas compressor is leaking by comparing output signals of the virtual performance model of the gas compressor in the at least one second state corresponding to the leak state of the gas compressor to the data corresponding to sensed operating conditions of the gas compressor,
   wherein the health information includes a leak cause indication regarding why the gas compressor is leaking based on the determining information corresponding to why the gas compressor is leaking based on frequency domain analysis.

4. The method of claim 1, wherein the virtual structure model is a virtual vibration sensor-based model.

5. The method of claim 1, further comprising determining whether the remaining useful life of the gas compressor reaches an end-of-life threshold,
   wherein the health information includes a compressor end-of-life indication that gas compressor life is a predetermined amount away from a predicted end life of the gas compressor when the remaining useful life of the gas compressor is determined to have reached the end-of-life threshold.

6. The method of claim 1, wherein the determining, onboard the gas compressor, based on frequency domain analysis, whether the gas compressor is leaking, is performed using an Electronic Control Module (ECM) of the gas compressor.

7. The method of claim 1, wherein the output signals of the virtual performance model of the gas compressor in the first state are output based on the data corresponding to sensed operating conditions of the gas compressor.

8. The method of claim 1, further comprising outputting a control signal to shut down the gas compressor responsive to determining that the gas compressor is leaking.

9. A system to monitor health of a compressor, the system comprising:
   memory configured to store a generated performance model of the compressor in a healthy state and generated performance models of the compressor in different fault states; and
   a controller in communication with the memory, the controller configured to:
      compare output signals of the performance model of the compressor in the healthy state, which have been subjected to frequency domain analysis by the controller, to first data of the compressor sensed during operation of the compressor,
      determine whether the compressor has one or more faults based on the compared output signals of the performance model of the compressor in the healthy state and the first data of the compressor sensed during operation of the compressor, compare output signals of the performance models of the compressor in the different fault states, which have been subjected to frequency domain analysis by the controller, to the first data of the compressor sensed during operation of the compressor, determine a potential cause or causes of the one or more faults based on the compared output signals of the performance models of the compressor in the different fault states and the first data of the compressor sensed during operation of the compressor, and output a command to cause display of fault information when the compressor is determined to have the one or more faults, the fault information including an indication of the determined potential cause or causes of the one or more faults.

10. The system of claim 9, wherein each of the one or more faults is representative of a failure of the compressor in the form of a leak, a bearing failure, a stuck valve, or a damaged piston rod.

11. The system of claim 9, wherein the controller is configured to control display of the fault information on a display of a user interface to monitor the health of the compressor.

12. The system f claim 9,
wherein the memory is configured to store a structure-based model, and
wherein the controller is configured to predict the one or more faults based on output signals of the structure-based model.

13. The system of claim 12, wherein the structure-based model receives data from one or more vibration sensors to generate the output signals of the structure-based model.

14. The system of claim 9,
wherein the memory is configured to store a structure-based model, and
wherein the controller is configured to predict a remaining useful life of the compressor based on outputs of the structure-based model.

15. The system of claim 9,
wherein the memory is configured to store a structure-based model, and
wherein the controller is configured to:
compare output signals of the structure-based model, which have been subjected to frequency domain analysis, to second data of the compressor sensed during operation of the compressor, and
determine the potential cause or causes of the one or more faults based on the compared output signals of the structure-based model and the second data of the compressor sensed during operation of the compressor.

16. The system of claim 9, wherein the structure-based model is a vibration sensor-based structure model.

17. The system of claim 9, wherein the controller and the memory are components of an Electronic Control Module (ECM) of the compressor.

18. The system of claim 9, wherein the controller is configured to:
determine a remaining useful life of the compressor based on outputs of a virtual structure model and saved historical health data of the compressor,
determine whether the determined remaining useful life of the compressor has reached a predetermined end-of-life threshold, and
cause output of a compressor end-of-life estimation indication responsive to the determined useful life of the compressor reaching the predetermined end-of-life threshold.

19. A method of determining a leak condition of a gas compressor, the method comprising:
generating a performance model of the gas compressor in a healthy state;
generating performance models of the gas compressor in different fault states, including at least one fault state corresponding to the leak condition of the gas compressor;
generating a structure-based prediction model for the gas compressor;
determining, based on frequency domain analysis performed by circuitry of an Electronic Control Module (ECM) of the gas compressor, whether the gas compressor is leaking by comparing output signals of the performance model of the gas compressor in the healthy state to first sensed real-time data of the gas compressor;
determining, using the circuitry of the ECM, whether the gas compressor is anticipated to leak by comparing output signals of the structure-based prediction model for the gas compressor to second sensed real-time data of the gas compressor, the second sensed real-time data of the gas compressor being different from the first sensed real-time data of the gas compressor;
determining, using the circuitry of the ECM, where the gas compressor is leaking by comparing output signals of the performance model of the gas compressor in the fault state corresponding to the leak condition of the gas compressor to the first sensed real-time data of the gas compressor; responsive to a determination that the gas compressor is leaking;
determining, using the circuitry of the ECM, where and when the gas compressor is anticipated to leak responsive to a determination that the gas compressor is anticipated to leak; and
outputting, on a display, health information identifying one or more of whether the circuitry of the ECM determines that the gas compressor is leaking or anticipated to leak, where the gas compressor is leaking or anticipated to leak, or when the gas compressor is anticipated to leak.

\* \* \* \* \*